US011924713B2

(12) United States Patent
Lan

(10) Patent No.: US 11,924,713 B2
(45) Date of Patent: *Mar. 5, 2024

(54) DEVICE-BASED TIMELY EMERGENCY CALL ROUTING

(71) Applicant: T-Mobile USA, Inc., Bellevue, WA (US)

(72) Inventor: Wei-Ming Lan, Newcastle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/166,684

(22) Filed: Feb. 9, 2023

(65) Prior Publication Data
US 2023/0188944 A1    Jun. 15, 2023

Related U.S. Application Data

(63) Continuation of application No. 17/332,937, filed on May 27, 2021, now Pat. No. 11,589,188.

(51) Int. Cl.
*H04W 24/00* (2009.01)
*G01S 19/42* (2010.01)
*H04W 4/029* (2018.01)
*H04W 4/90* (2018.01)

(52) U.S. Cl.
CPC ............. *H04W 4/029* (2018.02); *G01S 19/42* (2013.01); *H04W 4/90* (2018.02)

(58) Field of Classification Search
CPC .......... H04W 4/029; H04W 4/90; G01S 19/42
See application file for complete search history.

(56) References Cited

U.S. PATENT DOCUMENTS

| 5,815,808 A | 9/1998 | Valentine |
| 5,930,701 A | 7/1999 | Skog |
| 5,943,619 A | 8/1999 | Coyne et al. |
| 6,006,085 A | 12/1999 | Balachandran |
| 6,131,024 A | 10/2000 | Boltz |
| 6,161,006 A | 12/2000 | Balachandran |
| 6,189,626 B1 | 2/2001 | Hanseder |
| 6,233,445 B1 | 5/2001 | Boltz et al. |
| 6,449,479 B1 | 9/2002 | Sanchez |
| 6,625,461 B1 | 9/2003 | Bertacchi |
| 7,136,633 B2 | 11/2006 | Daly |

(Continued)

FOREIGN PATENT DOCUMENTS

| AU | 2204197 A | 9/1997 |
| AU | 4730697 A | 5/1998 |

(Continued)

*Primary Examiner* — Erika A Washington
(74) *Attorney, Agent, or Firm* — Perkins Coie LLP

(57) ABSTRACT

Systems and methods for providing timely location estimates when a user equipment initiates a call to an emergency number are disclosed. The system enables a user equipment to send the earliest available location that the user equipment can come up with, after detecting an emergency message (e.g., detecting a 911 digit string). This can be done by sending the current location of the user equipment via HTTPS protocol to a telecommunications service provider node (e.g., an end point in GMLC). In this manner, the system avoids a major overhaul of the existing 3GPP E911 location standard while allowing timely compliance of the NG911 mandate.

20 Claims, 4 Drawing Sheets

(56) References Cited

U.S. PATENT DOCUMENTS

| | | |
|---|---|---|
| 7,181,529 B2 | 2/2007 | Bhatia et al. |
| 7,203,502 B2 | 4/2007 | Wilson et al. |
| 7,516,219 B2 | 4/2009 | Moghaddam et al. |
| 7,817,033 B2 | 10/2010 | Motoyama |
| 8,315,634 B2 | 11/2012 | Gustavsson |
| 8,369,875 B1 | 2/2013 | Lee et al. |
| 8,395,495 B2 | 3/2013 | Raduchel |
| 8,437,742 B2 | 5/2013 | Garskof |
| 8,514,968 B2 | 8/2013 | Jovicic et al. |
| 8,761,764 B2 | 6/2014 | Mccann et al. |
| 8,837,306 B2 | 9/2014 | Vigue et al. |
| 8,885,540 B2 | 11/2014 | Robertson et al. |
| 9,021,554 B2 | 4/2015 | Cassidy et al. |
| 9,191,853 B2 | 11/2015 | Kosseifi et al. |
| 9,232,349 B2 | 1/2016 | Mikan et al. |
| 9,303,997 B2 | 4/2016 | Mcgavran et al. |
| 9,326,264 B2 | 4/2016 | Shakespeare et al. |
| 9,398,403 B2 | 7/2016 | Yoakum |
| 9,444,422 B2 | 9/2016 | Bharj et al. |
| 9,503,856 B2 | 11/2016 | Cherian et al. |
| 9,507,027 B2 | 11/2016 | Edge |
| 9,781,574 B2 | 10/2017 | Wawrowski et al. |
| 9,788,262 B2 | 10/2017 | Tietz et al. |
| 9,860,177 B2 | 1/2018 | Kosseifi et al. |
| 10,080,175 B1 | 9/2018 | Migaldi |
| 10,142,782 B2 | 11/2018 | Gillen et al. |
| 10,404,595 B2 | 9/2019 | Ranjan et al. |
| 10,499,235 B2 | 12/2019 | Gazdziak et al. |
| 10,687,273 B1 | 6/2020 | Varma et al. |
| 10,827,422 B1 | 11/2020 | Xu et al. |
| 10,869,249 B2 | 12/2020 | Migaldi |
| 10,932,091 B2 | 2/2021 | Dicke et al. |
| 10,959,040 B2 | 3/2021 | Feldman et al. |
| 11,589,188 B1 * | 2/2023 | Lan .................. G01S 19/42 |
| 2002/0037722 A1 | 3/2002 | Hussain et al. |
| 2002/0037744 A1 | 3/2002 | Bhatia et al. |
| 2002/0095312 A1 | 7/2002 | Wheat |
| 2002/0156729 A1 | 10/2002 | Nilson et al. |
| 2003/0027571 A1 | 2/2003 | Karlsson et al. |
| 2004/0058688 A1 | 3/2004 | Silver et al. |
| 2004/0192352 A1 | 9/2004 | Vallstrom et al. |
| 2004/0203901 A1 | 10/2004 | Wilson et al. |
| 2005/0143097 A1 | 6/2005 | Wilson et al. |
| 2005/0228860 A1 | 10/2005 | Hämynen et al. |
| 2006/0223552 A1 | 10/2006 | True et al. |
| 2007/0112511 A1 | 5/2007 | Burfeind et al. |
| 2007/0150362 A1 | 6/2007 | Sharma et al. |
| 2007/0214209 A1 | 9/2007 | Maeda |
| 2007/0281703 A1 | 12/2007 | Shkedi |
| 2008/0114862 A1 | 5/2008 | Moghaddam et al. |
| 2009/0079591 A1 | 3/2009 | Motoyama |
| 2009/0252059 A1 | 10/2009 | Vigue et al. |
| 2009/0309742 A1 | 12/2009 | Alexander et al. |
| 2010/0029272 A1 | 2/2010 | Mccann et al. |
| 2011/0092185 A1 | 4/2011 | Garskof |
| 2011/0316672 A1 | 12/2011 | Burris et al. |
| 2012/0057646 A1 | 3/2012 | Jovicic et al. |
| 2012/0276889 A1 | 11/2012 | Raduchel |
| 2014/0018110 A1 | 1/2014 | Yoakum |
| 2014/0024398 A1 | 1/2014 | Mikan et al. |
| 2014/0278051 A1 | 9/2014 | Mcgavran et al. |
| 2014/0315574 A1 | 10/2014 | Shakespeare et al. |
| 2016/0044497 A1 | 2/2016 | Soini |
| 2016/0105773 A1 | 4/2016 | Wawrowski et al. |
| 2016/0277912 A1 | 9/2016 | Titus et al. |
| 2017/0041749 A1 | 2/2017 | Dowlatkhah et al. |
| 2018/0020333 A1 | 1/2018 | Gillen et al. |
| 2018/0192363 A1 | 7/2018 | Holma |
| 2018/0199179 A1 | 7/2018 | Rauner |
| 2019/0149974 A1 | 5/2019 | Gazdziak et al. |
| 2019/0166047 A1 | 5/2019 | Ranjan et al. |
| 2019/0197563 A1 | 6/2019 | Iannace et al. |
| 2020/0305065 A1 | 9/2020 | Varma et al. |
| 2021/0090156 A1 | 3/2021 | Deveaux et al. |

FOREIGN PATENT DOCUMENTS

| | | |
|---|---|---|
| AU | 6025898 A | 8/1998 |
| AU | 4431099 A | 1/2000 |
| AU | 725268 B2 | 10/2000 |
| AU | 726903 B2 | 11/2000 |
| AU | 746904 B2 | 5/2002 |
| AU | 2003237993 B2 | 5/2008 |
| AU | 2011316490 A1 | 5/2013 |
| AU | 2013217184 A1 | 8/2014 |
| AU | 2016200905 A1 | 5/2016 |
| AU | 2018273895 A1 | 12/2019 |
| AU | 2018375148 A1 | 6/2020 |
| AU | 2018375148 B2 | 9/2020 |
| AU | 2018273895 B2 | 4/2021 |
| CA | 2277182 A1 | 7/1998 |
| CA | 2315709 A1 | 7/1999 |
| CA | 2336392 A1 | 1/2000 |
| CA | 2338512 A1 | 2/2000 |
| CA | 2402335 A1 | 10/2001 |
| CA | 2277182 C | 7/2009 |
| CA | 2447959 C | 1/2013 |
| CA | 2657573 C | 1/2015 |
| CA | 2380015 C | 9/2016 |
| CA | 3024151 A1 | 1/2018 |
| CA | 3065721 A1 | 1/2018 |
| CA | 3063557 A1 | 11/2018 |
| CA | 3083213 A1 | 6/2019 |
| CN | 1204446 A | 1/1999 |
| CN | 1234165 A | 11/1999 |
| CN | 1348667 A | 5/2002 |
| CN | 1098008 C | 1/2003 |
| CN | 1197425 C | 4/2005 |
| CN | 1868225 A | 11/2006 |
| CN | 103095815 A | 5/2013 |
| CN | 103095815 B | 12/2015 |
| CN | 105119873 A | 12/2015 |
| CN | 102177749 B | 5/2016 |
| CN | 105620391 A | 6/2016 |
| CN | 105657780 A | 6/2016 |
| CN | 105848125 A | 8/2016 |
| CN | 102804820 B | 9/2016 |
| CN | 103561450 B | 10/2017 |
| CN | 104429154 B | 4/2018 |
| CN | 103491502 B | 9/2018 |
| CN | 103455570 B | 12/2018 |
| CN | 106454751 B | 5/2019 |
| CN | 110663266 A | 1/2020 |
| CN | 110914843 A | 3/2020 |
| DE | 19782142 B3 | 9/2013 |
| EP | 0882374 A1 | 12/1998 |
| EP | 1189473 A2 | 3/2002 |
| EP | 1062826 B1 | 6/2002 |
| EP | 1406462 A2 | 4/2004 |
| EP | 1723808 A2 | 11/2006 |
| EP | 1768316 A2 | 3/2007 |
| EP | 0953260 B1 | 3/2008 |
| EP | 1895800 A1 | 3/2008 |
| EP | 2311284 A2 | 4/2011 |
| EP | 3010256 A1 | 4/2016 |
| EP | 1768316 B1 | 5/2016 |
| EP | 3603171 A1 | 2/2020 |
| EP | 3823363 A1 | 5/2021 |
| KR | 20070022049 A | 2/2007 |
| KR | 20070029437 A | 3/2007 |
| KR | 100735321 B1 | 7/2007 |
| KR | 20090058732 A | 6/2009 |
| KR | 100914697 B1 | 8/2009 |
| KR | 20090090888 A | 8/2009 |
| KR | 100923387 B1 | 10/2009 |
| KR | 100947805 B1 | 3/2010 |
| KR | 20110079913 A | 7/2011 |
| KR | 101361829 B1 | 2/2014 |
| KR | 101547034 B1 | 8/2015 |
| KR | 101663400 B1 | 10/2016 |
| KR | 20170081694 A | 7/2017 |
| KR | 20190143462 A | 12/2019 |
| RU | 2117394 C1 | 8/1998 |
| RU | 2483484 C2 | 5/2013 |

(56) References Cited

FOREIGN PATENT DOCUMENTS

| | | | |
|---|---|---|---|
| TW | 516299 | B | 1/2003 |
| TW | 527814 | B | 4/2003 |
| TW | 201107777 | A | 3/2011 |
| TW | 201412159 | A | 3/2014 |
| TW | 201502475 | A | 1/2015 |
| TW | I483636 | B | 5/2015 |
| TW | I511601 | B | 12/2015 |
| TW | I577969 | B | 4/2017 |
| TW | I661741 | B | 6/2019 |
| WO | 1997030559 | | 8/1997 |
| WO | 1998017074 | | 4/1998 |
| WO | 1998025420 | | 6/1998 |
| WO | 1998031168 | | 7/1998 |
| WO | 1998049860 | | 11/1998 |
| WO | 1999020066 | | 4/1999 |
| WO | 1999033309 | | 7/1999 |
| WO | 1999066706 | | 12/1999 |
| WO | 2000002374 | | 1/2000 |
| WO | 2000013036 | | 3/2000 |
| WO | 2000037743 | | 6/2000 |
| WO | 2000067494 | | 11/2000 |
| WO | 2001069570 | | 9/2001 |
| WO | 2001076275 | | 10/2001 |
| WO | 2002025963 | | 3/2002 |
| WO | 2002096130 | | 11/2002 |
| WO | 2003067851 | | 8/2003 |
| WO | 2003107713 | | 12/2003 |
| WO | 2005053336 | A2 | 6/2005 |
| WO | 2005079160 | A2 | 9/2005 |

\* cited by examiner

DEVICE-BASED TIMELY EMERGENCY CALL ROUTING

CROSS-REFERENCE TO RELATED APPLICATIONS

This application is a continuation of U.S. patent application Ser. No. 17/332,937, filed on May 27, 2021, now U.S. Pat. No. 11,589,188, entitled DEVICE-BASED TIMELY EMERGENCY CALL ROUTING, which is hereby incorporated by reference in its entirety.

BACKGROUND

Enhanced 911, E-911, or E911 is a system used in North America to automatically provide the caller's location to 911 dispatchers. An incoming 911 call is routed to a public safety answering point (PSAP), which is a call center operated by the local government. At the PSAP, the call is answered by a specially trained official known as a 911 dispatcher. The dispatcher's computer receives information from the telephone company about the physical address (for landlines) or geographic coordinates (for wireless) of the caller. This information is used to dispatch police, fire, medical, and other services as needed. For example, in addition to the voice transmission, the network also transmits an automatic number identification (ANI) associated with the current call. The 911 operator (or the operator's computer) at the PSAP searches an automatic location identification (ALI) database for the ANI to find the caller's relevant location.

The billing address associated with a mobile device is not necessarily considered the location to which emergency responders should be sent, since the device is portable. This means that locating the caller is more difficult. To locate a mobile telephone geographically, there are generally the following three approaches: Enhanced Cell ID (E-CellID, or E-CID); global navigation satellite systems (GNSS) or assisted GNSS (A-GNSS/AGPS); and device-based hybrid (DBH) approach. DBH location uses a mix of location methods available to the device including crowd-sourced Wi-Fi, A-GNSS, and handset-based sensors. It also includes an associated uncertainty estimate reflective of the quality of the returned location.

BRIEF DESCRIPTION OF THE DRAWINGS

Detailed descriptions of implementations of the present invention will be described and explained through the use of the accompanying drawings.

Figure 1:
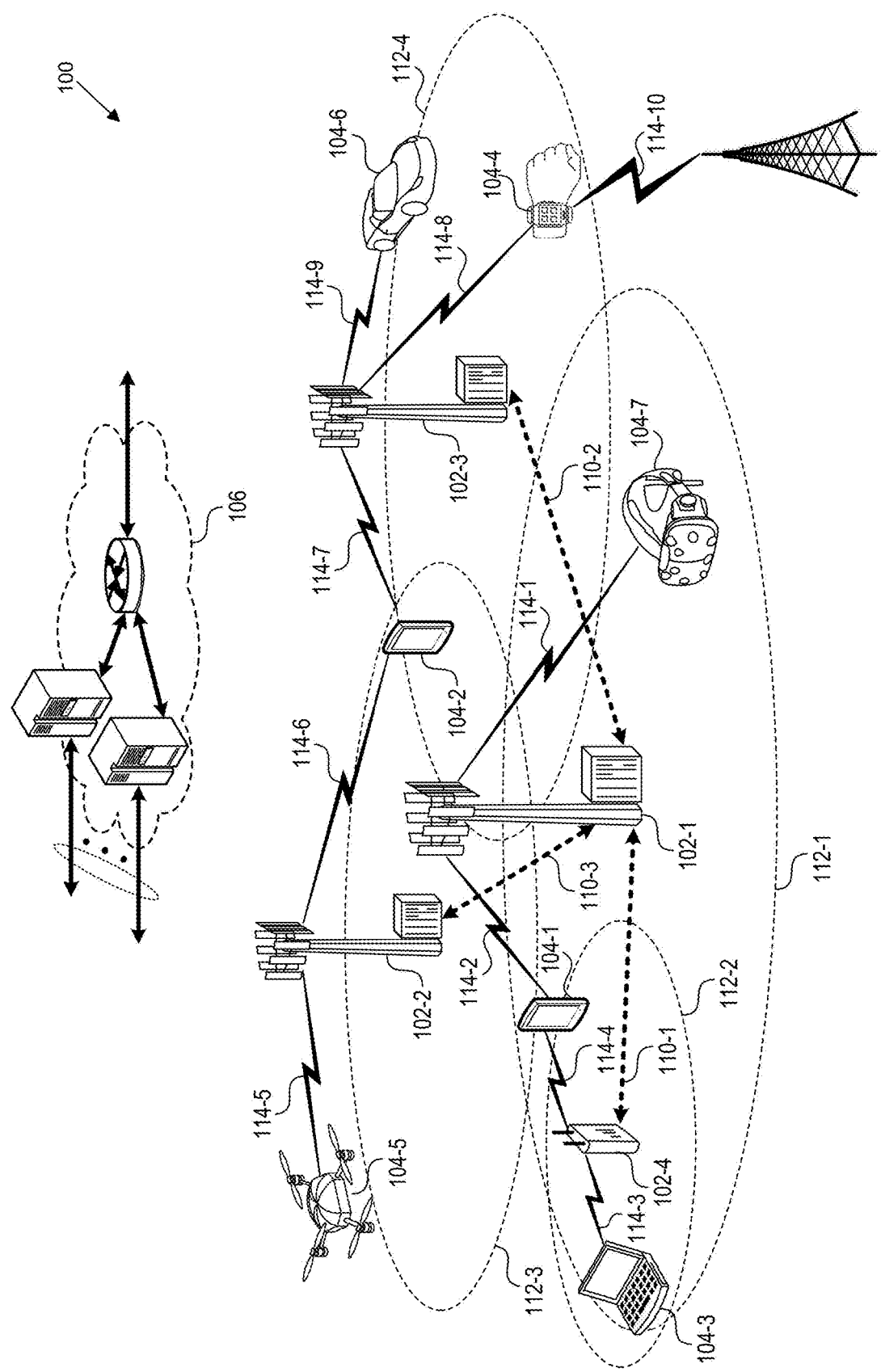
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Today's E911 location technologies include E-CID, A-GNSS, and DBH. Each technology has its strengths and weaknesses under different environments (e.g., indoors, outdoors, etc.). And, the availability of the location estimate also varies from environment to environment. For example, A-GNSS is more accurate in outdoor environments and can be available much quicker than it can be in indoor environments. On the other hand, DBH based on Wi-Fi can be available indoors when multiple Wi-Fi access points can be detected, but it is not as accurate outdoors.

When a user dials an emergency number (e.g., 911), it is important for a PSAP to determine an accurate location of the user to respond in a timely manner. However, current E911 technologies suffer from several drawbacks due to which they are unable to determine a more accurate and timely location of a user dialing an emergency number. For instance, during an emergency call on an LTE or 5G SA network, a user equipment (UE) generates an A-GNSS and DBH location estimate and provides E-CID measurements to a node in a telecommunications network (e.g., eSMLC/LMF). The network node will then pick a location estimate with the lowest uncertainty to send to the Gateway Mobile Location Centre (GMLC), which contains functionality required to support location-based service (LBS). Currently, 3GPP only allows two location responses from the UE to eSMLC/LMF, and only allows one location response from eSMLC/LMF to GMLC. As a result, eSMLC/LMF must wait for all three of the location estimates—E-CID, A-GNSS, and DBH—to arrive before it can decide which one to send to GMLC. However, since the availability of the location estimate varies from environment to environment, this results in delays when providing an accurate location to the PSAP.

Figure 2:
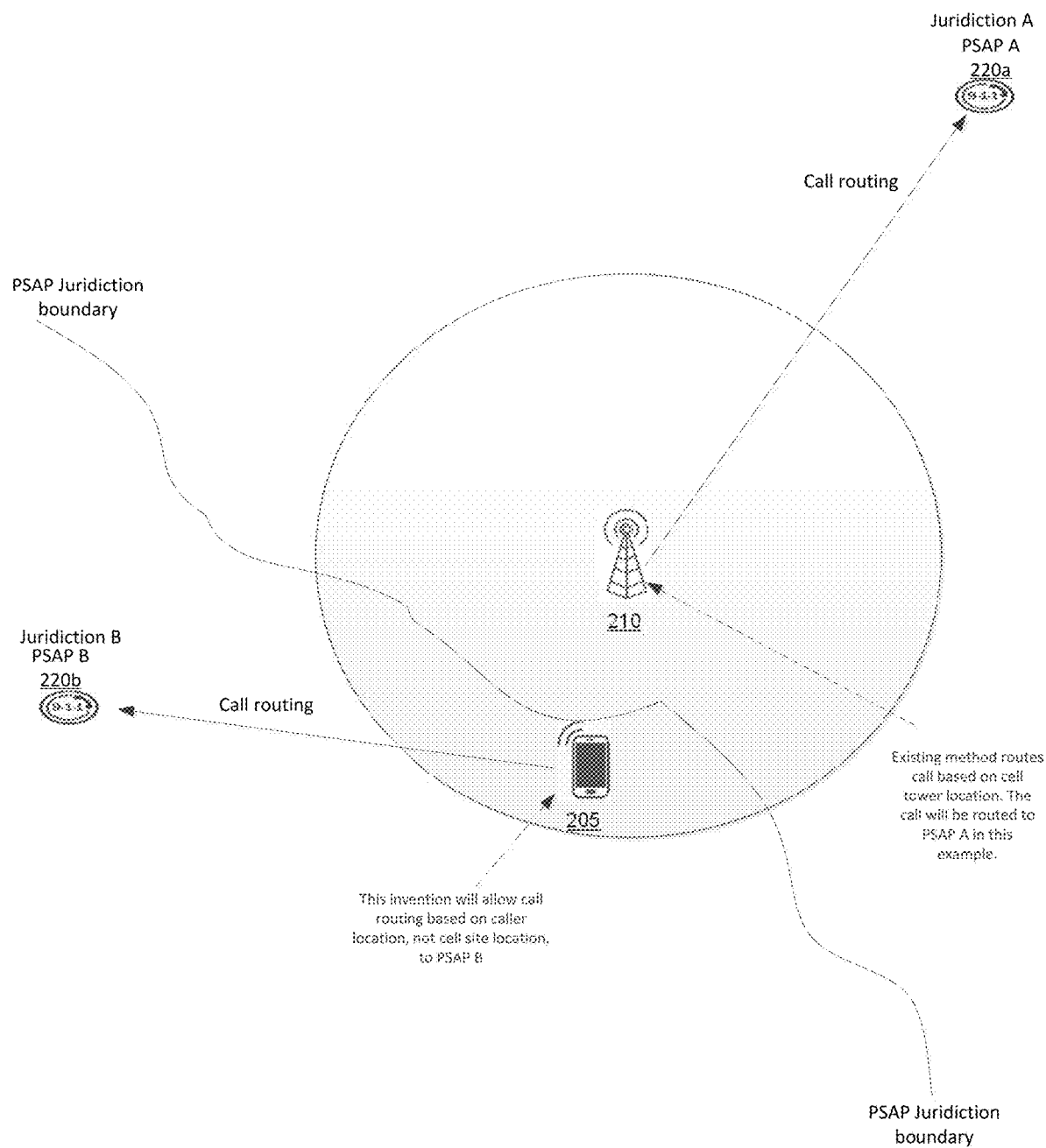
FIG. 2 is an environment diagram that illustrates emergency call routing according to some implementations of the disclosed system.

Further, one of the next generation 911 (NG911) requirements imposed on wireless service providers by the FCC is that the wireless service provider must route the emergency call to the PSAP that has jurisdiction over the location where the call was initiated instead of to the neighboring PSAP that has no jurisdiction over the location where the call was initiated. Routing the call to the correct PSAP decreases the time in which a first responder could provide urgently needed help to people in need, without causing confusion. In most circumstances, while a UE can typically determine its precise location within a few seconds (e.g., indoors by DBH methods and outdoors by A-GNSS methods), the current 3GPP standard does not provide mechanisms for timely and reliable delivery of the caller's location to the telecommunications network before the network needs to set up and connect the E911 call. As a result, using current methods, an E911 call is typically routed to the PSAP based on the cell tower's location rather than the caller's more precise location. For example, as illustrated in FIG. 2, existing methods will route a call from UE 205 to PSAP A 220a based on the location of the cell tower 210.

To solve these and other problems with current E911 technologies, the inventors have conceived and reduced to practice systems and methods for providing device-based timely location estimates when a UE initiates an emergency notification (e.g., a call to an emergency number). The system enables a UE to send the earliest available location that the UE can come up with, after detecting an emergency message (e.g., detecting the 911 digit string). This can be done by sending the current location of the UE via HTTPs protocol to a telecommunications service provider node (e.g., an end point in GMLC). As a result, the service provider can always have the most accurate and up-to-date location information available to timely and accurately respond to emergency calls. For example, as illustrated in FIG. 2, using the disclosed system, a service provider can route the E911 call to PSAP B 220*b* based on the caller's actual location instead of the closest cell site location. In this manner, the system avoids a major overhaul of the existing 3GPP E911 location standard while allowing timely compliance of NG911 mandate.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNBs is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid Automatic Repeat Request (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include UE such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) operation (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Timely Emergency Message Routing System

Figure 3:
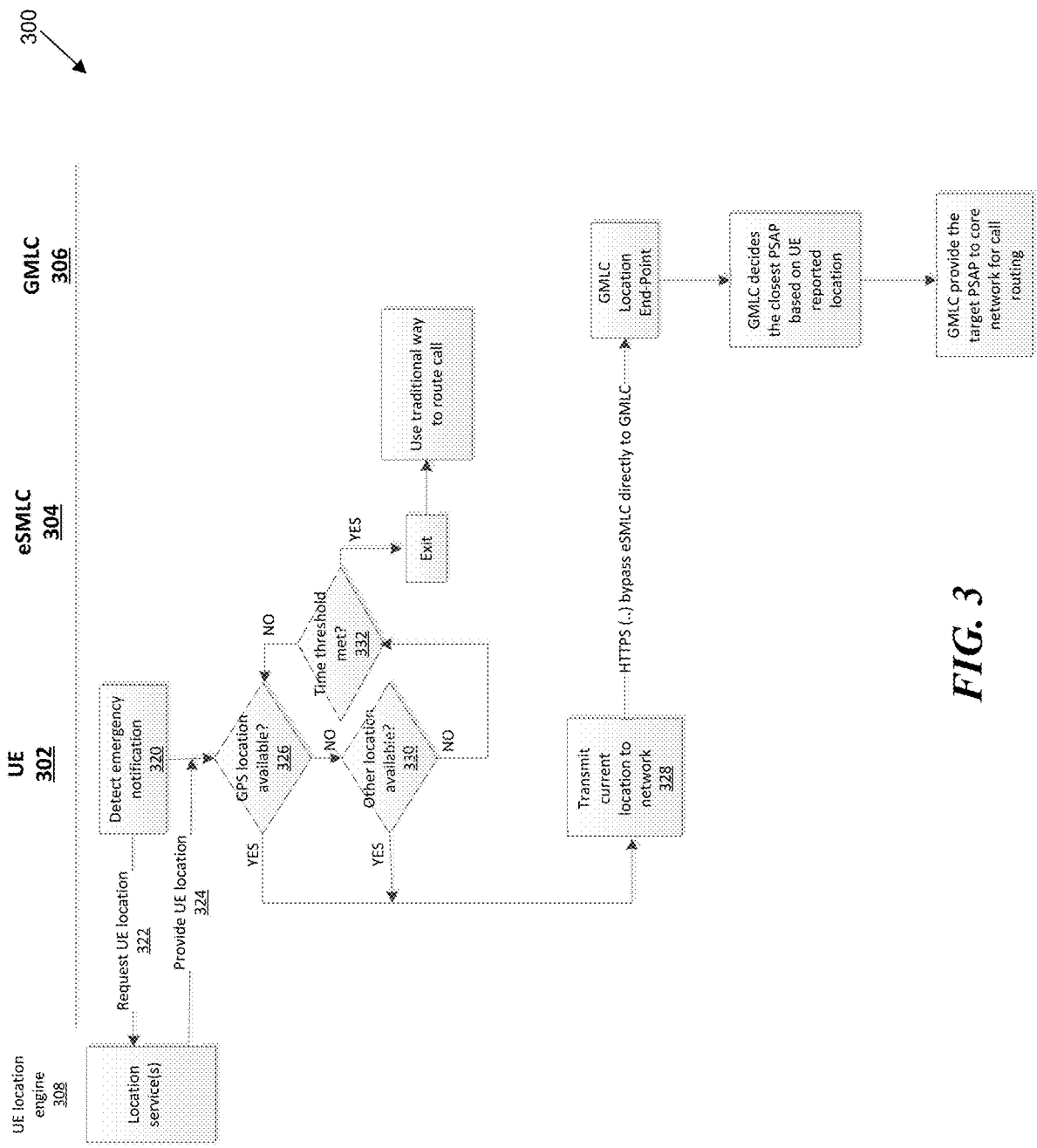
FIG. 3 is a flowchart that illustrates a process performed by the disclosed system in some implementations.

FIG. 3 is a flowchart that illustrates a process 300 performed by the disclosed system in some implementations. Process 300 begins when UE 302 detects, at block 320, that a user has initiated an emergency notification (e.g., an E911 call, emergency text message, emergency app alert, etc.). For example, when a user dials 911, the UE parses the dialed string to detect that an emergency call has been initiated. Upon detecting the emergency notification, at block 322, UE 302 accesses a location engine 308 to determine the current location of UE 302. The location engine 308 can reside in memory at UE 302 (e.g., as an app) or can reside at a remote server that is communicatively coupled to UE 302. The location engine 308 identifies the current location of the UE using one or more location mechanisms, such as a fused location provider API (e.g., Google® Play FLP location app), built-in GPS sensor(s), and so on. At block 324, the location engine 308 transmits the UE's current location to UE 302. UE 302 can wait for a predetermined period of time (e.g., 5 seconds) before checking whether it receives a location response from the location engine 308. When the location response is available (e.g., GPS location available='Yes' at block 326), UE 302 initiates a network connection to send the available location information to a network node in the telecommunications service network. In some implementations, UE 302 initiates a connection via a high-level point-to-point protocol on top of Internet Protocol (IP) layer, such as TCP/IP, UDP/IP, and so on. For example, UE 302 initiates a Hypertext Transfer Protocol Secure (HTTPS) connection with the GMLC 306 and transmits a packet comprising the information that can be used to uniquely identify the UE, a location estimate of the UE, and/or the quality of the location estimate. For example, the information in the packet can include one or more of the following information: location of the UE (e.g., latitude/longitude and/or altitude of the caller location), mobile number, IMEI, location confidence level and uncertainty, time stamp, civic address of the corresponding location, and so on. As another example, UE 302 sends a message via Short Message Services (SMS) to send the location information to GMLC 306. In this manner, process 300 can bypass communications with intermediate network nodes (e.g., eSMLC 304) and instead communicate directly with GMLC 306, which can then identify the closest PSAP based on the current location information of the UE. The GMLC 306 provides the identified PSAP information to the core network for call routing. In this way, the GMLC can always send the most currently accurate value of the user's current location to the core network.

When the location response is not available (e.g., GPS location available='No' at block 326), UE 302 checks whether UE location information is available via one or more other location mechanisms, such as E-CID or DBH. When location information is available (e.g., DBH location available='Yes' at block 330), UE 302 proceeds to block 328 to initiate a network connection to send the available location information to a network node in the telecommunications service network. When location information is not available (e.g., DBH location available='No' at block 330), UE 302 can check whether a predetermined period of time (e.g., 5 seconds) has elapsed since the emergency notification was initiated. When the period of time has not elapsed, UE 302 again checks whether it has received a location response from the location engine 308. On the other hand, when the period of time has elapsed, UE 302 uses existing technologies and techniques for routing the emergency notification to the network nodes.

Computer System

Figure 4:
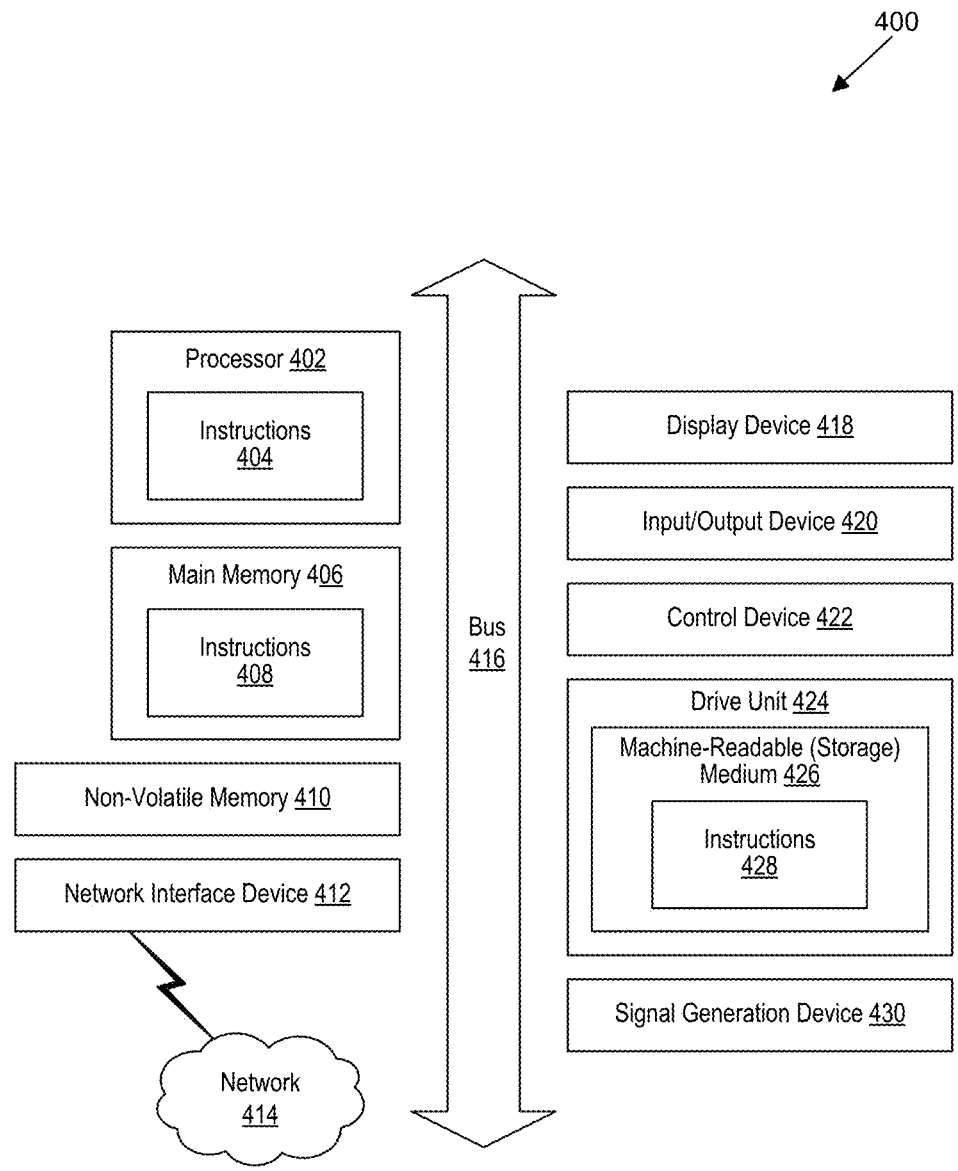
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable (storage) medium 426) can be local, remote, or distributed. Although shown as a single medium, the machine-readable (storage) medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computer system 400. The machine-readable (storage) medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether a term is elaborated upon or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents, applications, and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention, for example as described in co-pending application Ser. No. 17/387,789 filed Jul. 28, 2021, titled "Emergency Alert Systems and Methods for Differently Abled Persons" and Ser. No. 17/334,595 filed May 28, 2021, titled "Mobile Device Geographic Location Determination for Emergency Services," the contents of which are incorporated by reference in their entireties.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or a continuing application.

I claim:

1. At least one computer-readable storage medium, excluding transitory signals and carrying instructions, which, when executed by at least one data processor of a user equipment, cause the user equipment to:
responsive to an indication of an emergency notification, transmit, to a location engine, a request for a current location of the user equipment,
wherein the location engine identifies the current location of the user equipment using a first location mechanism;
when a response comprising the current location of the user equipment is received from the location engine within a first threshold period of time:
transmit, to a telecommunications service network node, a message comprising the current location of the user equipment determined using the first location mechanism; and
when a response comprising the current location of the user equipment is not received from the location engine within the first threshold period of time:
determine the current location of the user equipment using a second location mechanism;
determine whether the current location of the user equipment is available using the first location mechanism or the second location mechanism within a second threshold period of time from when the emergency notification was initiated; and
transmit, to the telecommunications service network node, the message comprising the current location of the user equipment determined using the second location mechanism,
wherein the current location of the user equipment is transmitted to the telecommunications service network node via the message only when the current location is available within the second threshold of time.

2. The at least one computer-readable storage medium of claim 1, wherein the message is sent via a point-to-point protocol connection or a Short Message Services (SMS) connection.

3. The at least one computer-readable storage medium of claim 1, wherein the instructions, when executed by the at least one data processor of the user equipment, further cause the user equipment to:
parse a destination address of the emergency notification to identify whether the destination address comprises a predetermined string of alphanumeric characters associated with the emergency notification.

4. The at least one computer-readable storage medium of claim 1, wherein the location engine is an application installed at the user equipment.

5. The at least one computer-readable storage medium of claim 1, wherein the location engine is stored in memory at a server communicatively coupled to the user equipment.

6. The at least one computer-readable storage medium of claim 1, wherein the first location mechanism is a fused location provider application program interface.

7. The at least one computer-readable storage medium of claim 1, wherein the second location mechanism is one of: Enhanced Cell ID, global navigation satellite systems (GNSS), Assisted GNSS (A-GNSS), or device-based hybrid approach (DBH).

8. A computer-implemented method to enable timely emergency notification routing in a telecommunications network, the method comprising:
responsive to an indication of an emergency notification initiated by a user equipment, transmit, to a location engine, a request for a current location of the user equipment, wherein the location engine identifies the current location of the user equipment using a first location mechanism;
when a response comprising the current location of the user equipment is received from the location engine within a first threshold period of time:
  transmit, to a telecommunications service network node, a message comprising the current location of the user equipment determined using the first location mechanism; and
when a response comprising the current location of the user equipment is not received from the location engine within the first threshold period of time:
  determine the current location of the user equipment using a second location mechanism;
  determine whether the current location of the user equipment is available using the first location mechanism or the second location mechanism within a second threshold period of time from when the emergency notification was initiated; and
  transmit, to the telecommunications service network node, the message comprising the current location of the user equipment determined using the second location mechanism,
  wherein the current location of the user equipment is transmitted to the telecommunications service network node via the message only when the current location is available within the second threshold of time.

9. The method of claim 8, wherein the message is sent via a point-to-point protocol connection or a Short Message Services (SMS) connection.

10. The method of claim 8 further comprising:
parsing a destination address of the emergency notification to identify whether the destination address comprises a predetermined string of alphanumeric characters associated with the emergency notification.

11. The method of claim 8, wherein the location engine is an application installed at the user equipment.

12. The method of claim 8, wherein the location engine is stored in memory at a server communicatively coupled to the user equipment.

13. The method of claim 8, wherein the first location mechanism is a fused location provider application program interface.

14. The method of claim 8, wherein the second location mechanism is one of: Enhanced Cell ID, global navigation satellite systems (GNSS), Assisted GNSS (A-GNSS), or device-based hybrid approach (DBH).

15. A system comprising:
at least one hardware processor; and
at least one non-transitory memory storing instructions, which, when executed by the at least one hardware processor, cause the system to:
  responsive to an indication of an emergency notification initiated a user equipment, transmit, to a location engine, a request for a current location of the user equipment,
    wherein the location engine identifies the current location of the user equipment using a first location mechanism;
  when a response comprising the current location of the user equipment is received from the location engine within a first threshold period of time:
    transmit, to a telecommunications service network node, a point-to-point protocol message comprising the current location of the user equipment determined using the first location mechanism; and
  when a response comprising the current location of the user equipment is not received from the location engine within the first threshold period of time:
    determine the current location of the user equipment using a second location mechanism;
    determine whether the current location of the user equipment is available using the first location mechanism or the second location mechanism within a second threshold period of time from when the emergency notification was initiated; and
    transmit, to the telecommunications service network node, the message comprising the current location of the user equipment determined using the second location mechanism,
    wherein the current location of the user equipment is transmitted to the telecommunications service network node via the message only when the current location is available within the second threshold of time.

16. The system of claim 15, wherein the message is sent via a point-to-point protocol connection or a Short Message Services (SMS) connection.

17. The system of claim 15, wherein the instructions, when executed by the at least one hardware processor of the system, further cause the system to:
parse a destination address of the emergency notification to identify whether the destination address comprises a predetermined string of alphanumeric characters associated with the emergency notification.

18. The system of claim 15, wherein the location engine is an application installed at the user equipment.

19. The system of claim 15, wherein the location engine is stored in memory at a server communicatively coupled to the user equipment.

20. The system of claim 15, wherein the first location mechanism is a fused location provider application program interface, and wherein the second location mechanism is one of: Enhanced Cell ID, global navigation satellite systems (GNSS), Assisted GNSS (A-GNSS), or device-based hybrid approach (DBH).

* * * * *